Jan. 3, 1967         A. G. DEAN         3,295,642
FRICTION SURFACE AND LINING FASTENER
Filed April 30, 1965

INVENTOR.
Albert G. Dean
BY
William R. Nolte
ATTORNEY

United States Patent Office 3,295,642
Patented Jan. 3, 1967

3,295,642
FRICTION SURFACE AND LINING FASTENER
Albert G. Dean, Narberth, Pa., assignor to The Budd Company, Philadelphia, Pa., a corporation of Pennsylvania
Filed Apr. 30, 1965, Ser. No. 452,195
1 Claim. (Cl. 188—234)

This invention relates to a conformable rotary disk brake shoe assembly and has for an object the provision of improvements in this art.

The present invention lies in the same general field as that of U.S. Patents 2,451,329 Gaenssle and 2,451,326 Eksergian. As explained in those patents, heavy-duty disk brakes, as for railway vehicles, may at times develop heat at a very high rate, which heat must largely be removed from the friction surface through the metal brake disk. If the brake disk has an uneven surface, as may be the case after use even though truly planar when new, the high spots may produce local zones of unusually high temperature which can cause local heat checks or cracks in the brake disk and greatly increase local wear on the brake shoe lining.

In those embodiments the situation was relieved by providing each brake shoe with a plurality of brake shoe lining blocks or elements and backing them with resilient pads so that each segmental lining block could have separate conformatory universal tilting movement relative to the turning brake disk. This conformatory movement may be described as a tilting in a plurality of directions, as about axes parallel to the brake disk surface and extending in all directions in a plane parallel to the mean surface plane of the brake disk.

The constructions provided by these patents, over the years, gave very satisfactory service and the present invention aims to maintain the advantages of the patent construction but with improvements thereon.

One of the particular objects of the present invention is to provide a construction of this general character and effectiveness which is simpler and more economical.

Another object is to provide a brake block assembly which is composed of few and simple parts and which is easily manufactured, installed, and maintained.

Another object is to provide a brake block assembly having all-nonmetallic parts, specifically all-brake-lining elements.

Another object is to provide a brake block assembly composed of parts which do not deteriorate even after long use.

The above and other objects of the invention, as well as various novel features and advantages, will be apparent from the following description of an exemplary embodiment shown in the accompanying drawings, wherein.

The general disk brake assembly is shown by the above-mentioned patents and is now in general use, so it is thought to be unnecessary to illustrate or describe the flat-faced rotary disk or the brake shoe operating mechanism used in such disk brake assemblies. Only the brake shoe assembly itself is shown.

Figure 1:
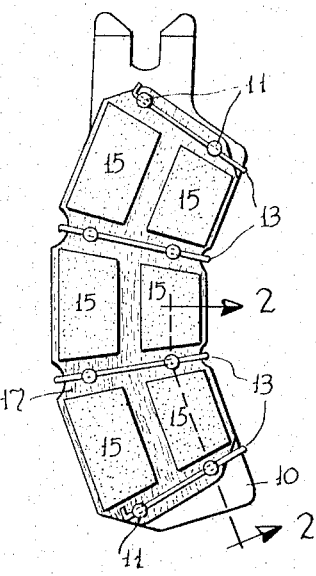
FIG. 1 is a plan or face view of a brake shoe assembly embodying the invention.
Figure 2:
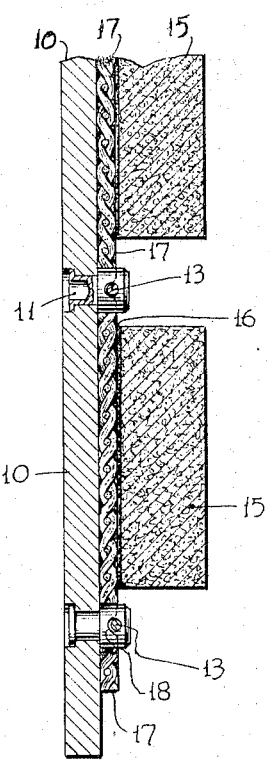
FIG. 2 is a partial enlarged section taken on the line 2—2 of FIG. 1.

The assembly for one shoe comprises a backing plate or shoe proper 10 which in use is removably secured on a mounting member of the shoe operating mechanism. The shoe formations needed for such securement to the mounting member are shown in FIG. 1 but it is thought to be unnecessary to describe them.

As one convenient means for removably securing the brake lining assembly on the shoe, there are provided a plurality of projections or studs 11 which are staked in holes in the shoe plate 10 for permanent retention thereon, the studs being provided with transversely aligned holes 12 for receiving securing wires 13 which, after insertion, are bent on their ends for locking the lining assembly in position without contacting the brake disk.

The brake lining assembly comprises segmental brake blocks 15, of suitable composition material of known types commonly used, cemented on their backs, as at 16, to a sheet of resilient backing material 17. The backing sheet 17 is preferably thicker than the space between the shoe face and the wires 13 and provided with transverse grooves 18 to receive the securing wires in a forced manner to hold the backing sheet firmly in place.

The backing sheet is formed of locally resilient, specifically compressible, material which permits each block to tilt in any direction necessary to conform to any irregularities which may be present on the brake disc; yet the backing sheet is stiff enough and strong enough to take all braking loads. A woven brake lining material has been found to be very suitable for this purpose.

The backing sheet 17 carries a plurality of brake lining blocks 15 and one such sheet may carry all of the blocks of a shoe assembly, six such segmental blocks being shown for the shoe illustrated.

The backing sheet is of sufficient thickness, in keeping with the vertical or trans-planar resilience of the material used, to provide all the necessary universal tilting movement of the several lining blocks.

With the present arrangement it is not necessary to use the separate rubber backing sheet pads for each brake block required by the patent constructions; nor is it necessary to provide cupped stampings to hold the rubber pads in position; yet all desired local universal tilting movement of the brake blocks is provided. The manufacturing operations are greatly simplified; the number of parts to stock is greatly reduced, one or a few composite units only being needed in most cases; the danger of disarrangement in assembling and in use is eliminated; and the deterioration with use and age, characteristic of rubber pads, is eliminated.

It is thus seen that the invention provides a very simple, inexpensive, and effective brake shoe assembly which furnishes the universal tilting movement needed for each brake block to reduce local heat-checking of the brake disk and undue wear of the brake lining.

While one embodiment of the invention has been described for purposes of illustration, it is to be understood that there may be various embodiments and modifications within the general scope of the invention.

I claim:

A rotary disk brake assembly, comprising in combination a brake shoe plate having a lining supporting surface, means projecting from said supporting surface of said brake shoe plate, supporting sheet means having one of its surfaces in engagement with said supporting surface of said brake shoe plate, said sheet means including a plurality of apertures to receive said projecting means and having a plurality of local depressions in the other surface aligned with and extending to said apertures, a plurality of segmental brake lining blocks bonded to said other surface of said supporting sheet means and capable of transmitting braking reaction forces thereto when in operative engagement with a rotary disc, said supporting sheet means being of woven material and resilient and compressible in a direction normal to its plane to permit each lining block to tilt in any direction, said supporting sheet means being rigid and having a great strength in a direction parallel to its plane to transmit said braking reaction forces from said lining blocks to said projecting means without movement and deflection relative to said projecting means, and retaining means cooperating with said projecting means and received in said local depressions to thereby hold said supporting sheet means in engagement with said brake shoe plate.

References Cited by the Examiner

UNITED STATES PATENTS

| | | | |
|---|---|---|---|
| 1,872,547 | 8/1932 | Feder. | |
| 1,917,993 | 7/1933 | Morris | 188—234 X |
| 2,451,326 | 10/1948 | Eksergian et al. | 188—234 |
| 2,451,329 | 10/1948 | Gaenssle | 188—234 |
| 3,198,294 | 8/1965 | Stacy | 188—234 |

FERGUS S. MIDDLETON, *Primary Examiner.*

MILTON BUCHLER, *Examiner.*

G. E. A. HALVOSA, *Assistant Examiner.*